US005483656A

United States Patent [19]
Oprescu et al.

[11] Patent Number: 5,483,656
[45] Date of Patent: Jan. 9, 1996

[54] SYSTEM FOR MANAGING POWER CONSUMPTION OF DEVICES COUPLED TO A COMMON BUS

[75] Inventors: Florin Oprescu, Sunnyvale; Michael D. Teener, Santa Cruz, both of Calif.

[73] Assignee: Apple Computer, Inc., Cupertino, Calif.

[21] Appl. No.: 5,364

[22] Filed: Jan. 14, 1993

[51] Int. Cl.⁶ .................................. G06F 1/26; G06F 1/32
[52] U.S. Cl. .................... 395/750; 364/273.1; 364/273.2; 364/273.3; 364/273; 364/DIG. 1; 364/492; 364/707
[58] Field of Search ............................ 395/750; 364/707, 364/492; 320/15; 307/66, 69; 365/226, 227

[56] References Cited

U.S. PATENT DOCUMENTS

| | | | |
|---|---|---|---|
| 4,167,786 | 9/1979 | Miller et al. | 364/493 |
| 4,312,035 | 1/1982 | Greene | 395/750 |
| 4,514,142 | 4/1985 | Young | 416/1 |
| 4,611,289 | 9/1986 | Coppola | 364/492 |
| 4,677,566 | 6/1987 | Whittaker et al. | 364/492 |
| 4,809,163 | 2/1989 | Hirosawa et al. | 395/750 |
| 5,167,024 | 11/1992 | Smith et al. | 395/375 |
| 5,191,520 | 3/1993 | Eckersley | 363/72 |
| 5,283,905 | 2/1994 | Saadeh et al. | 395/750 |
| 5,287,525 | 2/1994 | Lum et al. | 395/750 |
| 5,293,632 | 3/1994 | Novakovich | 395/750 |
| 5,300,874 | 4/1994 | Shimamoto et al. | 320/15 |
| 5,339,445 | 8/1994 | Gasztonyi | 395/750 |

OTHER PUBLICATIONS

IBM Technical Disclosure Bulletin, vol. 16, No. 7, Dec. 1973, New York, p. 2429, Power Management.

Primary Examiner—Gopal C. Ray
Attorney, Agent, or Firm—Blakely, Sokoloff, Taylor & Zafman

[57] ABSTRACT

The power management system tracks the total amount of power drawn from a bus by devices connected to the bus and to the bus itself, based on the individual operational status of each device. The power manager system also tracks the total amount of power supplied to the bus. From this information the power manager system determines whether a power surplus exists sufficient to allow an additional device to operate or to allow a currently operating device to draw more power. Power usage requests received from devices connected to the bus are granted or denied by the power management system based on the determination of available power. The power management system additionally is capable of sequencing the use of several devices to allow the devices to each operate while maintaining the total power draw within an acceptable range. The system provides for efficient use of a limited amount of power to allow operation of more devices than conventionally allowed with a bus. The system also can activate power supply devices which are off-line via soft-power-on commands to increase the total amount of power available. The system is advantageously implemented with any bus system having devices drawing power from the bus from power supplies providing limited power.

21 Claims, 11 Drawing Sheets

SYSTEM FOR MANAGING POWER CONSUMPTION OF DEVICES COUPLED TO A COMMON BUS

BACKGROUND OF THE INVENTION

1. FIELD OF THE INVENTION

The present invention relates to computer systems and in particular to a device interconnection bus for use in interconnecting components of a computer system.

2. RELATED APPLICATIONS

This application is related to U.S. patent application Ser. No. 07/994,983, entitled "Method and Apparatus for Arbitrating on an Acyclic Directed Graph," which is assigned to the assignee of the present invention.

3. DESCRIPTION OF RELATED ART

Device interconnection busses are commonly employed to connect individual components or devices of a computer system, or a group of networked computers, to each other to allow communication between the components. Although the interconnection bus is primarily provided to facilitate communication of data, commands and other signals between computer devices, conventional busses also provide a transmission line for distributing power to at least some of the devices connected to the bus.

Generally, a device connected to a bus either has its own power-supply or it requires power drawn from the bus. A device power-supply may be a battery power-supply or a power-supply capable of connecting into a wall electrical socket. Examples of computer devices which typically include a power-supply are printers, monitors, scanners, large disk drives, large speaker/amplifiers, video equipment, central processing units (CPU) and portable computers such as lap top or notebook computers. Portable computers typically have both battery-powered capability, as well as, AC power transformer capability for drawing power from an AC electrical wall socket. Examples of devices which typically lack a power-supply and therefor must draw power from the bus include a mouse, microphone, hand-held scanner, network access bridge, small disk drive, keyboard, cable extender and the like.

A sufficient amount of power must be supplied to the bus to power the bus itself and to power those devices which require power from the bus. A power-supply is provided which is capable of outputting a sufficient amount of power to the bus to power all devices connected to the bus that may require bus supplied power. Conventionally, the amount of power required is determined by assuming that all devices may be in operation at one time, and that such devices will be drawing maximum power. In other words, the computer system is configured by providing a power-supply sufficient to power all devices simultaneously at their maximum power levels. However, in practice not all devices operate simultaneously and, when operated, devices do not always consume the maximum amount of power which the device is capable of consuming. Hence, a power-supply of a conventional bus is capable of providing far more power than nominally required. This unnecessary power-supply excess adds costs to the system which may not be justified if not all devices do not operate simultaneously. In a conventional system, a fairly modest power-supply is provided, and the number of devices that can be connected to the bus is simply limited accordingly. Although this solution successfully prevents an overload of the bus caused by too many devices drawing too much power, the solution unnecessarily limits the capabilities of the bus. One of the primarily advantages of a bus interconnection is the flexibility of allowing a variety of devices to be interconnected and interchanged conveniently. This flexibility is lost if the total number of devices allowed for connection to the bus is unduly limited, or if the power-supply must be upgraded to allow an increase in the number of devices.

SUMMARY OF THE INVENTION

From the foregoing it can be appreciated that there is a need to provide an improved computer device interconnection bus system having a power management capability for maximizing the number of devices which can be connected to a bus. It is a particular object of the invention to provide a power management capability that exploits the fact that not all devices connected to a bus need be active simultaneously. It is a further object of the invention to provide such a power management capability in a device interconnection bus configured to IEEE 1394 standards.

These and other objects of the invention are achieved by a system for managing the power provided to devices connected to a device interconnect bus, wherein the system comprises:

(a) a means for maintaining information regarding the power draw requirements and the power-supply capabilities of devices connected to the bus;

(b) a means for determining an actual amount of power drawn by the devices from the bus and an actual amount of power supplied by the devices to the bus; and (c) a means for controlling operation of devices connected to the bus to ensure that a total power required by the devices does not exceed a maximum amount of power available to the bus. With these means, the system is capable of efficiently utilizing a modest amount of total power to operate a large number of devices.

In a preferred embodiment, the means for controlling operation of devices connected to the bus includes a means for receiving power usage requests from the bus specifying devices for which power is required and a means for determining whether an available power surplus exists which is sufficient to allow operation of the device. The control means further includes a means for denying the power usage request if an insufficient amount of power is available and means for granting the power usage request if sufficient power is available. The control means is additionally capable of postponing a grant of a power usage request to defer operation of a device pending an increase in surplus power.

In addition to the above-described means for monitoring and controlling the power used by devices connected to the bus, the control means of the preferred system also includes means for controlling the operation of devices that provide power to the bus to increase or decrease the amount of power being supplied to the bus. In this regard, the control means includes the capability for transmitting soft-power-on commands to devices which are inactive but which are capable of providing power when active. By activating such a device using a soft-power-on capability, the amount of power supplied to the bus is increased. The control means also includes the capability of deactivating such devices to decrease the amount of power supplied to the bus, when such additional power is not required.

Typically, devices are capable of operating in a number of different operational states which draw differing amounts of power, such as an inactive state, a wait or stand-by state and a fully operational state or such as a minimum operational power state and a preferred operational power state. To efficiently control power usage of devices operating in one of a number of possible states, the system maintains information regarding the individual operational states of the devices and determines an available surplus based on the actual operational state of each device. With this information the control means is capable of more precisely determining the actual power requirements of devices and more effectively controlling the operation of the devices to efficiently utilize available power.

In a preferred embodiment, the invention is implemented within a device interconnection bus configured to IEEE P1394 standards. The bus is a repeater bus having a plurality of devices connected to nodes arranged in an arbitrary topology. Each node includes means for receiving and transmitting bus signals including power usage requests. The bus requires a minimum amount of power to remain active, independent of devices connected to the bus. The means for maintaining information regarding the actual power usage of devices connected to the bus additionally maintains information on the minimum power required by the bus itself.

Also, the invention preferably includes means for controlling the operation of battery-powered devices connected to the bus to allow the battery-powered device to draw power from the bus when at least one non-battery-powered device is connected to the bus and to require the battery-powered device to supply power to the bus otherwise. To this end, a non-battery-powered device is configured to provide power to the bus at a higher voltage than is provided by battery-powered devices. An over-voltage protection circuit is connected to the battery-powered device to detect the voltage of power on the bus. The overprotection circuit disconnects the power-supply of the battery-powered device if a higher voltage is detected on the bus and connects the battery supply to the bus otherwise. Thus, the battery-powered device only draws power from the bus if at least one non-battery-powered device is supplying power. Otherwise, the battery-powered device supplies power to the bus. With this feature, the battery of a battery-powered device is conserved when not needed and utilized when needed.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

A power management system for use with a serial device interconnection bus is disclosed. In the following descriptions for the purposes of explanation details are set forth to provide a thorough understanding of the invention. However, these details are not necessarily required to practice the invention. In other instances, well known structures and circuits are shown in block diagram form to not obscure fundamental aspects of the invention.

Figure 1:
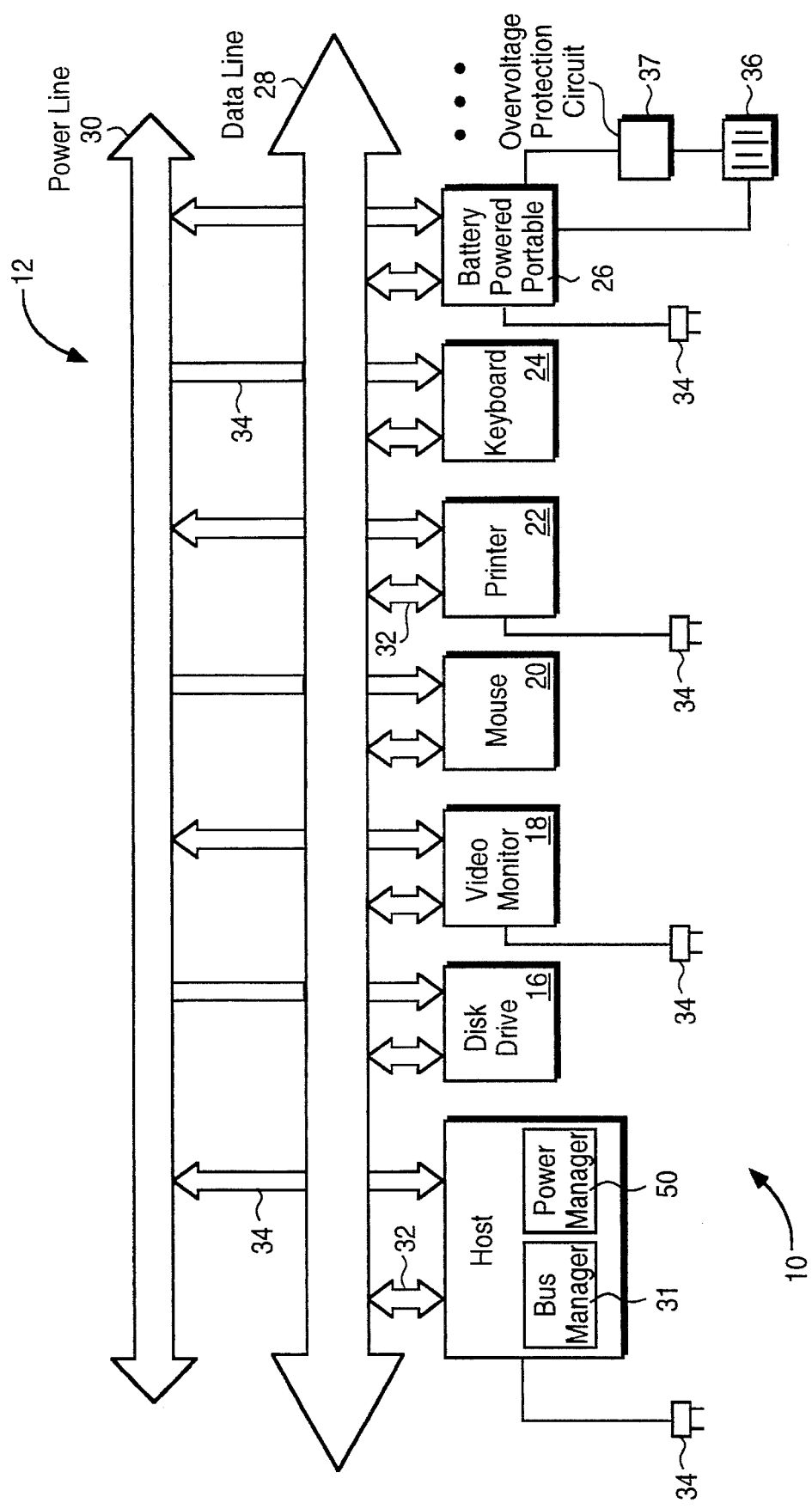
FIG. 1 is a simplified block diagram of a serial device interconnection bus configured in accordance with the invention.

Referring to the figures, preferred embodiments of the invention will now be described. FIG. 1 provides a highly simplified block diagram representation of a computer system 10 having individual components interconnected via a serial interconnection bus 12. Computer system 10 includes a host 14, a disk drive 16, a video monitor 18, an input mouse 20, a printer 22, keyboard 24, and a battery-powered portable computer 26, all interconnected via bus 12. The computer components represented in FIG. 1 are provided primarily for exemplary purposes and do not represent an exhaustive list of computer devices which are inter-connectable via bus 12. Rather, a wide variety of other devices are connectable via bus 12, including scanners, speaker/amplifiers, video equipment, microphones, network access bridges, and the like. Moreover components within host 14, such as the CPU, may be individually connected to bus 12. Bus 12 may interconnect the components of a single computer system or may interconnect several separate computers, such as a network of computers.

Serial bus 12 includes a signal transmission line 28 and a power transmission line 30. Signal transmission line 28 is provided for transmitting data, commands, and other signals between the computer devices. Signal transmission bus 28 may include a pair of conventional twisted-pair transmission cables. FIG. 1 merely provides a simplified representation of signal line 28 and power line 30. Each may include numerous internal cable components, as well as interconnection components, examples of which are described below with reference to FIGS. 4–10.

Host 14 includes a bus manager 31 which manages signals transmitted over signal transmission line 28 in accordance with conventional bus arbitration techniques.

Host 14, video monitor 18, printer 22 and portable 26 each include AC power input capability for receiving power from a conventional wall socket. Disk drive 10, mouse 20, and keyboard 24 lack a power-supply a require power from bus 12. Portable 26 includes both a battery power capability and an AC power input capability. In FIG. 1, AC power input capability is represented by power input cables 34 and the battery power capability of portable 26 is represented by battery unit 36. An over-voltage protection circuit 37 is provided in combination with the battery unit 36. The function of protection circuit 37 will be described below.

Each individual component of computer system 10 is connected to bus 12 via a signal line 32 and a power line 34. In FIG. 1, signal lines 32 and power lines 34 carry indices associated with each device. Double arrows represent two way data or power transmission, whereas singe arrows represent only one way transmissions. As can be seen from FIG. 1, each device is capable of both transmitting and receiving data via signal line 28. However, only host 34, video monitor 18, printer 22, and portable 26 are capable of supplying power to power transmission line 30. Disk drive 16, mouse 20 and keyboard 22 each lack internal power supplies and therefor must draw power from the bus. Hence, a sufficient amount of power must be supplied to the bus from host 34, video monitor 18, printer 22, and portable 26 to adequately power Disk drive 16, mouse 20 and keyboard 22.

In conventional systems, a host is provided with a power-supply sufficient to power all devices connected to the bus at their maximum power levels simultaneously. Upon system installation, however, it is not generally known how many such devices will ultimately be connected to the bus. Therefore, to insure adequate power, a conventional bus merely includes a limit to the total number of devices. This imposes an unnecessary constraint on the number of devices connectable to the bus or the size of the power-supply.

In practice, not all devices connected to a bus need to be in operation simultaneously. Indeed in many computer systems all devices cannot be in operation simultaneously. Thus an actual power requirement of the bus may be substantially less than the power required by assuming that all devices operate simultaneously. To allow connection of a larger number of devices than conventionally allowed, the computer system of the present invention includes a power manager 50, connected within host 14, for controlling the power use of devices connected to bus 12. Power manager 50 includes an ability to determine the actual amount of power utilized by devices connected to bus 12 and an ability to control the operation of the devices to ensure that the total power drawn does not exceed the maximum available. Power manager 50 is connected to bus manager 31 for coordinating power management with signal transfer management.

Figure 2:
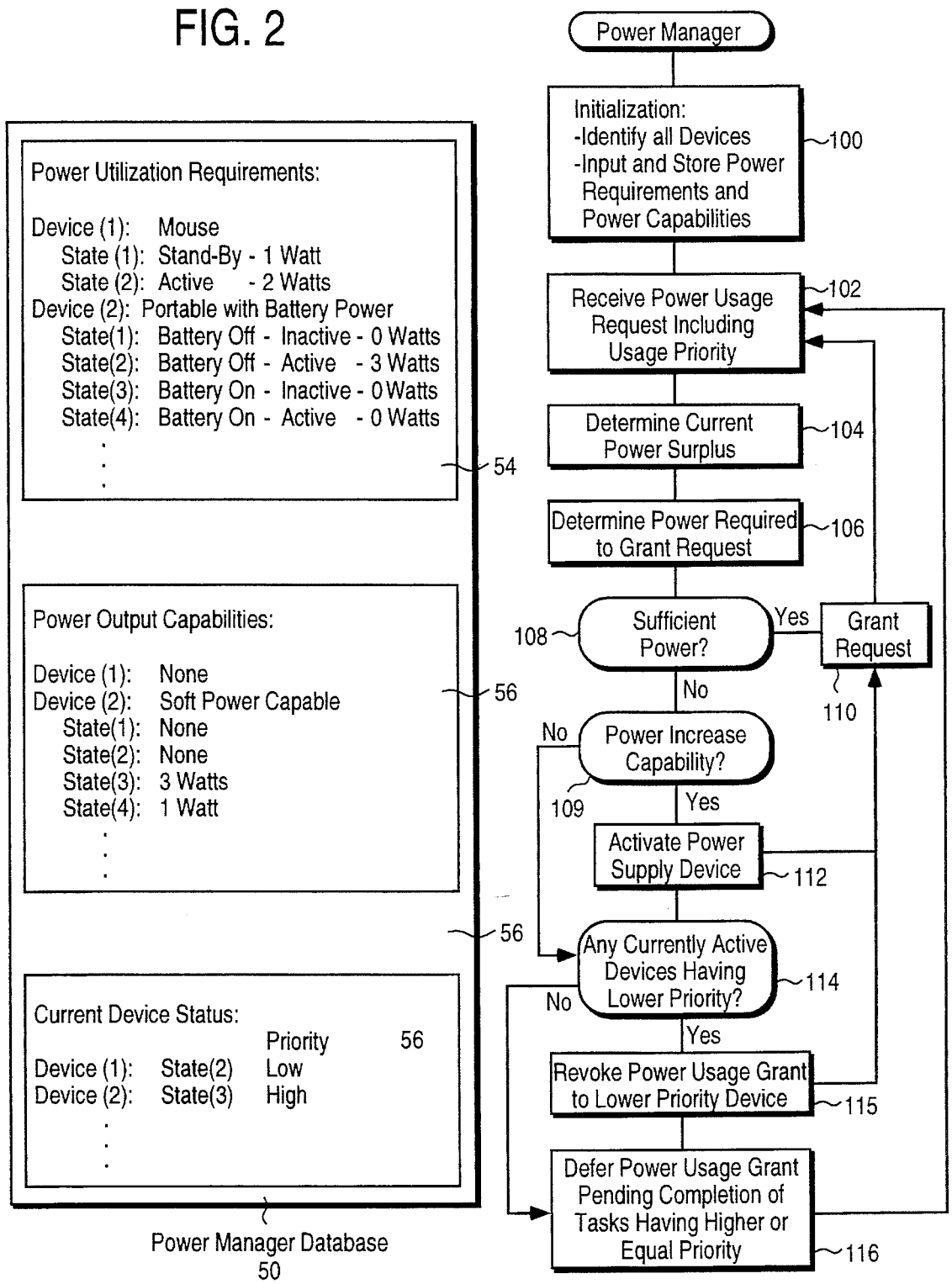
FIG. 2 is a flow chart representing a method by which a power manager system of the invention controls power usage on the serial bus of FIG. 1.

The procedure by which power manager 50 monitors total power usage and controls the operation of devices connected to the bus will be described primarily with reference to FIG. 2. FIG. 2 provides a flow chart illustration of the internal operation of power manager 50. Logical operations of power manager 50 are preferably implemented using a computer program executing within a processing unit of host 14. However, the operations of power manager 50 may alternatively be implemented using an integrated circuit or other hard-wired circuit techniques.

Power manager 50 is connected to data transmission bus 28 via bus manager 31 (FIG. 1) for receiving and transmitting data and command signal packets in accordance with conventional data bus transmission techniques and protocols. Power manager 50 includes a data base 52 including a power requirements table 54, and power output capability table 56, and a device status table 58. Power utilization table 54 stores the identity of each device, and its power draw requirements for each of a number of possible operational states. A mouse, for example, typically operates in one of two states: STAND-BY and ACTIVE. In STAND-BY, the mouse is stationary and merely requires sufficient power to detect movement. Once moved by an operator, the mouse automatically draws additional power sufficient to transmit new mouse coordinates onto bus 12. As examples, the mouse may draw 1 watt in STAND-BY and 2 watts in ACTIVE mode. Power requirements table 54 stores information specifying the two operational states of the mouse and the power required for each state.

As a second example, a portable computer with a battery capability but no AC power capability may operate in one of four possible states: BATTERY-OFF (INACTIVE), BATTERY OFF (ACTIVE), BATTERY ON (INACTIVE), and BATTERY ON (ACTIVE). In the battery off modes. With the battery off and the portable operating, the portable must draw power from the bus, typically 3 watts. However, in all other states, the portable does not require power, either because it is inactive or because it is utilizing its own power. Power requirement table stores values specifying the aforementioned power requirement states for the portable. Of course, the actual number of possible power requirement states of a portable may be more numerous, requiring more comprehensive information than represented in the example illustrated in FIG. 2.

As another example, a disk drive may utilize one level of power when in stand-by for providing disk drive intelligence, a greater amount of power accessing data, and an even greater amount of power for high speed data transfer. Each of the various operational states and the associated required power levels are maintained in table 54.

Although table 54 in FIG. 2 only provides exemplary values for two devices, table 54 actually stores values for all devices connected to the bus including the host and any bus components, such as repeater modules, capable of supplying or withdrawing power from the bus. The number of states of each device and the power required in each state is predetermined for each device. For devices having a large number of operational states, table 54 may preferably store only one or two values corresponding to maximum and minimum power requirements. This information may be stored in table 54 upon installation of the computer system. Preferably however, the information is received by power manager 50 upon system initialization over bus 12 from devices connected to the bus or from components of the bus itself. This will be described in grater detail below.

Power manager database 52 additionally includes a power output capability table 56. Whereas power requirements table 54 maintains information on the amount of power that a device is capable of drawing from the bus, power capability table maintains information on the amount of power the device is capable of supplying to the data bus, in each of its possible operational states. Each device listed in table 54 includes a corresponding record in table 56. For device(1), (a mouse), the power output capability is NONE regardless of its operational state, since the mouse has no power-supply. For device(2), (the portable computer), however the power-supply capability varies depending upon the operational status of the device. For example, for operational states 1 and 2 wherein the battery of the portable is OFF, the portable cannot supply any power to the bus. However, in operational state 3, wherein the battery is ON but the portable is INACTIVE, the portable is capable of providing 3 watts. In operational state 4, wherein the battery in ON and the portable is ACTIVE, the portable is capable of supplying 1 watt to the bus, which is surplus power in excess of its own requirements. As with the power utilization requirements stored in table 54, the values stored in table 56 are predetermined for each device connectable to bus 12.

Power management database 50 also includes a device status table 58 which maintains information on the actual operational state of each device connected to the bus. The values in table 58 are periodically updated during operation of the computer system to maintain accurate information. In the example illustrated in FIG. 2, device(1), (the mouse), is currently in operation state(2) corresponding to ACTIVE operation, i.e. an operator is currently moving the mouse.

Device (2) is currently in operational state (3) corresponding to an INACTIVE state wherein the portable is supplying power to the bus. Current status table 58 additionally includes priority values for each device. The use of the priority values is described below.

With the aforementioned tables, database 52 provides power manager 50 with all information necessary to determine the actual amount of power being supplied to the bus and the actual amount of power being withdrawn from the bus at the current time. Hence, power manager 50 has all information necessary to determine whether a power surplus exists sufficient to power additional devices.

The method by which power manager 50 manipulates the data stored within database 52 will now be described with reference to the flow chart included within FIG. 2. Initially, at step 100, power manager 50 initializes database 52 by receiving and storing information on all devices connected to bus 12. Information is received by power manager 50 from bus 12 via bus manager 31 in the form of data packets such as those conventionally used to transmit other types of data over a bus. The techniques by which packets are received and transmitted over bus 12 may be entirely conventional and will not be described in detail herein. Power manager 50 parses the information received over bus 12 and stores it in appropriate locations within database 52. The information received includes the power requirements and the power output capabilities of all devices connected to the bus. The initialization data also includes the current device status of all devices at system initialization.

The initialization data may be provided by the devices themselves. However, preferably, the computer system is configured in accordance with a repeater bus configuration, described below, in which each device is a part of a node which includes a dedicated chip (the Physical Interface chip, PHY, described below). The devices power requirements and capabilities are hardwired into the PHY. Upon system initialization the PHY automatically transmits the information over bus 12. In this manner, power manager 50 need only "listen" to data transmissions over bus 12 during system initialization to received the data for storing in database 52. An advantage of this implementation is that, when a device is removed from the bus or added to the bus while the bus is inactive, its dedicated PHY is also removed or added. Thus, upon initialization the power manager automatically receives data corresponding to the new system configuration. As an alternative, power data can be permanently stored in database 52 and manually updated by a system operator whenever a device is added to or removed from the system. The preferred implementation is more transparent to the system operator.

After initialization, execution proceeds to step 102 wherein the power manager receives power usage requests over bus 12 from devices connected to the bus. The power usage requests specify the identity of a device to be activated (a target device) and the operational state that is required for the device. The power usage request is transmitted in packets of data over bus 12 from either the target device or from a device which is requesting activation of the target device. For example, if a CPU requires data stored on a disk drive, the CPU transmits a power usage request to power manager 50 over bus 12 requesting activation of the disk drive and specifying that the desired operational state is a DATA ACCESS state.

At step 104, the power manager determines whether sufficient power is available on the bus to allow activation of the device. First, the power manager determines the total amount of power currently drawn from the bus by all devices connected to the bus. This is achieved by summing the power requirement values in table 54 for each of the current operational states specified in table 58. As an example, the calculation may yield a total power usage of 100 watts. Next, power manager determines the total amount of power drawn from bus 12 by summing the power output values in table 56 for each of the current operational states specified in table 58. This calculation may yield, as an example, a total of 110 watts, leaving a power surplus of 10 watts. Preferably, the power surplus value is stored as a running total. Thus, power manager need not continuously recalculate the total amount of power supplied to the bus and the total amount of power drawn from the bus. Rather, power manager 50 merely updates the running total of the power surplus as the operational states of the devices connected to the bus change.

After determining the power surplus, if any, execution proceeds to step 106 where power manager 50 determines the amount of power required to grant the power usage request. This is achieved by accessing power utilization requirements table 54 to determine the power required by the target device for the specified operation. Continuing with the example, if the disk drive requires 0.5 watt to read data, then the power required to grant the power usage request as determined at step 106 is 0.5 watts. At 108, the power manager determines whether there is a sufficient power surplus to grant the request by comparing the power required (0.5 watts) to the power surplus (10 watts). If sufficient power is available, the power usage request is granted at 110 and execution returns to step 102. Once the power usage request is granted, CPU transmits its READ command to the disk drive in accordance with conventional data bus command arbitration and transmission techniques. The disk drive then operates to read the data, with the disk assured to have an adequate amount of power. Upon completion of the disk drive operation, a data packet is sent to the power manager from the disk drive indicating that the operation has completed and the additional power is no longer required. Power manager updates device status table 58 accordingly.

If, at step 108, a sufficient amount of power is not available, execution continues at step 110 where the power manager determines whether the available power surplus can be increased to allow operation of the device. This determination is made by examining power output capability table 56 and device status table 58 to determine if there are any devices connected to the bus that are capable of providing the needed extra power but which are not currently supplying power. For example, a printer, which has a power-supply, may be turned off. If the printer is capable of being turned on remotely via a soft-power-on signal, then the amount of surplus power can be increased. Accordingly, a soft-power on signal is transmitted to the printer at step 112. The current device status table is updated to reflect the change in status of the printer. Assuming that sufficient power is now available to grant the power usage request, execution proceeds to step 110. Additional logic, not shown, may be provided to allow the printer to be automatically deactivated when it is determined that the extra powered supplied by the printer is no longer required. This determination may be made at termination of execution of the device for which the power usage grant was issued or at some later time.

If, at step 110, there are no devices capable of being activated that will supply additional power sufficient to allow a grant of the power usage request, execution proceeds to step 114. At 114, the power manager compares the priority of the power usage request with the priority of previously granted power usage requests. If devices are currently operating subject to a power usage request having a lower priority, the power manager revokes the previously granted power usage request thereby increasing the available power surplus sufficient to allow a grant of the new power usage request. A wide variety of prioritization schemes may be implemented, and additional logic, not shown, may be utilized. Generally, step 114 provides a power negotiation step allowing power manager 50 to arbitrate numerous power usage requests.

If no previously granted power usage requests can be revoked, then the current power usage request is deferred at step 116 pending an increase in surplus power. Although not shown, additional logic may be provided to facilitate processing of deferred power usage requests.

The operations of power manager 50 described herein are continuously re-executed in a loop to process all power usage requests received while the bus is on-line. By continuously tracking the amount of surplus power, if any, and by having a database providing power usage information for the entire bus, power manager 50 is capable of intelligently managing the operation of devices connected to the bus to ensure that power is utilized efficiently. This eliminates the need to provide a power-supply capable of providing enough power to operate all devices simultaneously at their maximum power levels. Hence, either a smaller power-supply may be utilized, or more devices can be connected, than with a conventional bus lacking a power management capability.

IEEE P1394 IMPLEMENTATION

Although the principles of the invention may be advantageously employed in a variety of data bus architectures, the invention is preferably employed within a data bus configured to IEEE P1394 standards having an arbitrary topology of connected devices. Relevant aspects of an implementation of a bus configured to IEEE P1394 standards are described in the copending U.S. patent application identified above and in IEEE Standards Document P1394 entitled "High Performance Serial Bus" attached as Appendix A.

Figure 3:
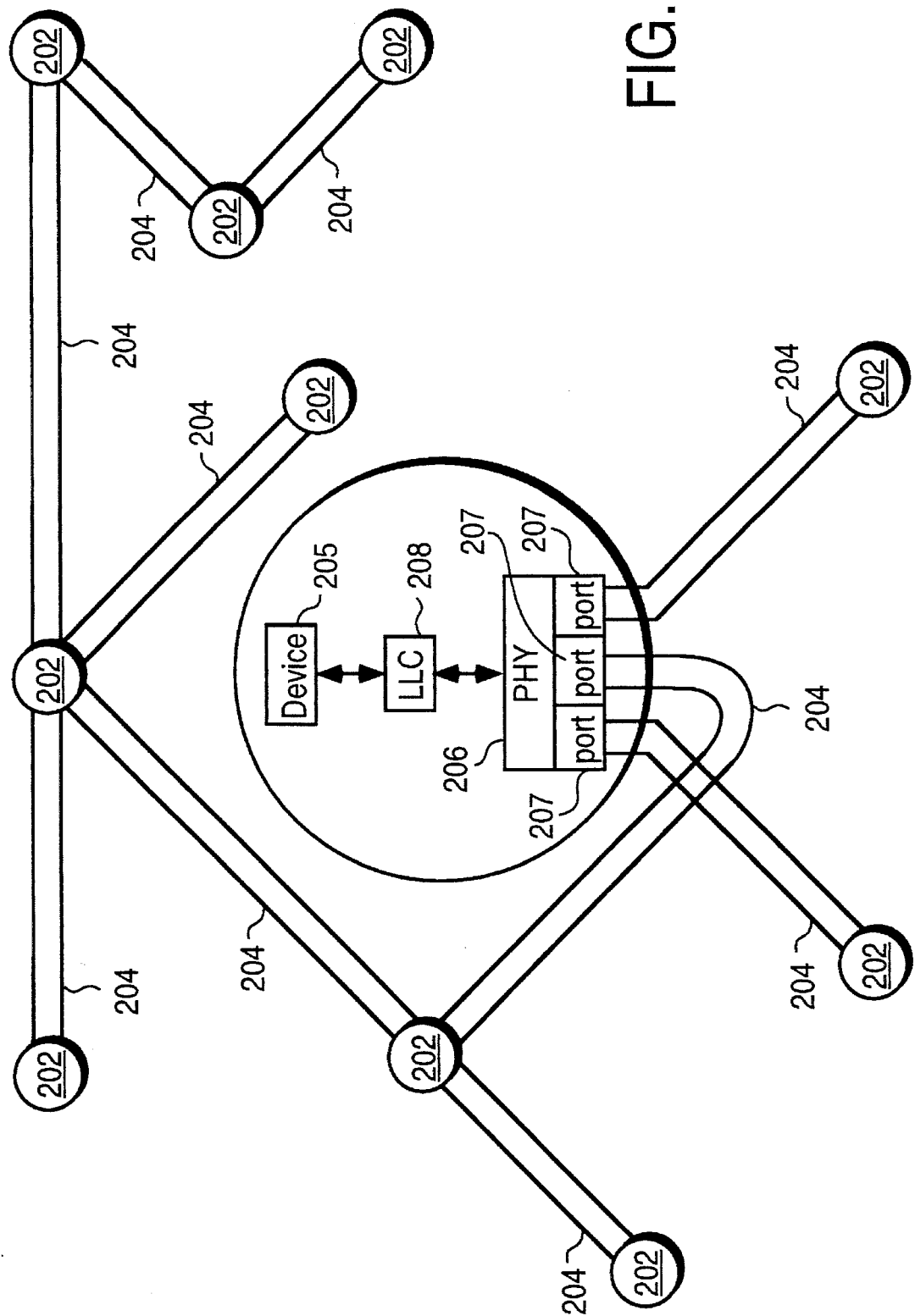
FIG. 3 is a graphical representation of an arbitrary bus topology in which the power manager system of FIG. 2 may be utilized.

FIG. 3 provides a schematic illustration of such a bus. Computer system 200 of FIG. 3A includes a set of nodes 202 connected via interconnection lines 204. Each node typically includes a device, such as a printer, mouse, CPU etc., one Physical Layer Interface (PHY) chip 206 with three external ports 207 and a single Link Layer Interface (LLC) chip 208. However, a node need not contain a LLC or a device, but need only include, at minimum, a single PHY chip with at least one port. Each port of PHY chip is connected to a socket (not shown in FIG. 3) which is connected through a cable to a socket of another node.

The PHY chip, through its external ports 207, operates as a repeater node allowing data packets to be sequentially transmitted between nodes. An individual node is illustrated in FIG. 3. Each PHY maintains the power initialization data, described above, pertaining to the device connected to the node. This data may be hard-wired onto the PHY using conventional techniques.

At minimum, a certain amount of power must be supplied to the PHY chips to allow operation of the bus, independent of the power required by devices connected to the bus. Accordingly, the power usage requirements database, described above, maintains information on the power required by each PHY chip, as well as the power required by devices connected to the bus. In this regard the PHY chip may be regarded as just another power consuming "device". Typically, each PHY, including its transmitting and receiving ports 207 requires about 0.5 watts as an overhead power requirement.

Considering specific devices which are connectable to the P1394 bus in greater detail, such devices may be broadly categorized as follows:

a) Low port count floating devices, which have at most two accessible ports, and cannot provide power to the bus. One port examples include a mouse, microphone, hand-held scanner, network access bridge. Two port examples include a small disk drive, small, video camera, keyboard, small speakers, and cable extenders.

b) Low power count autonomous devices, which have at most two accessible ports but can use their own power sources in addition to power supplied over the bus. One port examples include, a portable computer or a portable peripheral. Two port examples include, a disk drive, tape drive, scanner, small printer, speaker, and a Nu bus extension card.

c) Low port count internal devices, which are devices which reside within a CPU or high end printer and which are expected to operate only in conjunction with the host CPU or high end printer. Such devices have at most two ports, neither of which is accessible from the exterior of the host. A two port internal device is powered exclusively by the host machine and does not require power from the bus. Examples include disk drives, CD drives, built-in microphones, built-in cameras, and the like.

d) High port count devices, which have at least three accessible ports and a power supply distinct from the bus supplier. Examples include large devices such as printers, monitors, scanners, large Disk drives, large speakers/amplifiers, video equipment, CPU's, etc.

e) Battery powered devices, which are low port count autonomous deices. In general such battery powered devices have single external port and, at most, one internal port. The power supply is sufficient to power an entire bus, having only reduced size floating point devices, in addition to itself.

f) Power source and bus extender devices are special types of high port count devices. These devices have three ports and provide to the bus a maximum nominal power of about 54 watts.

Figure 4:
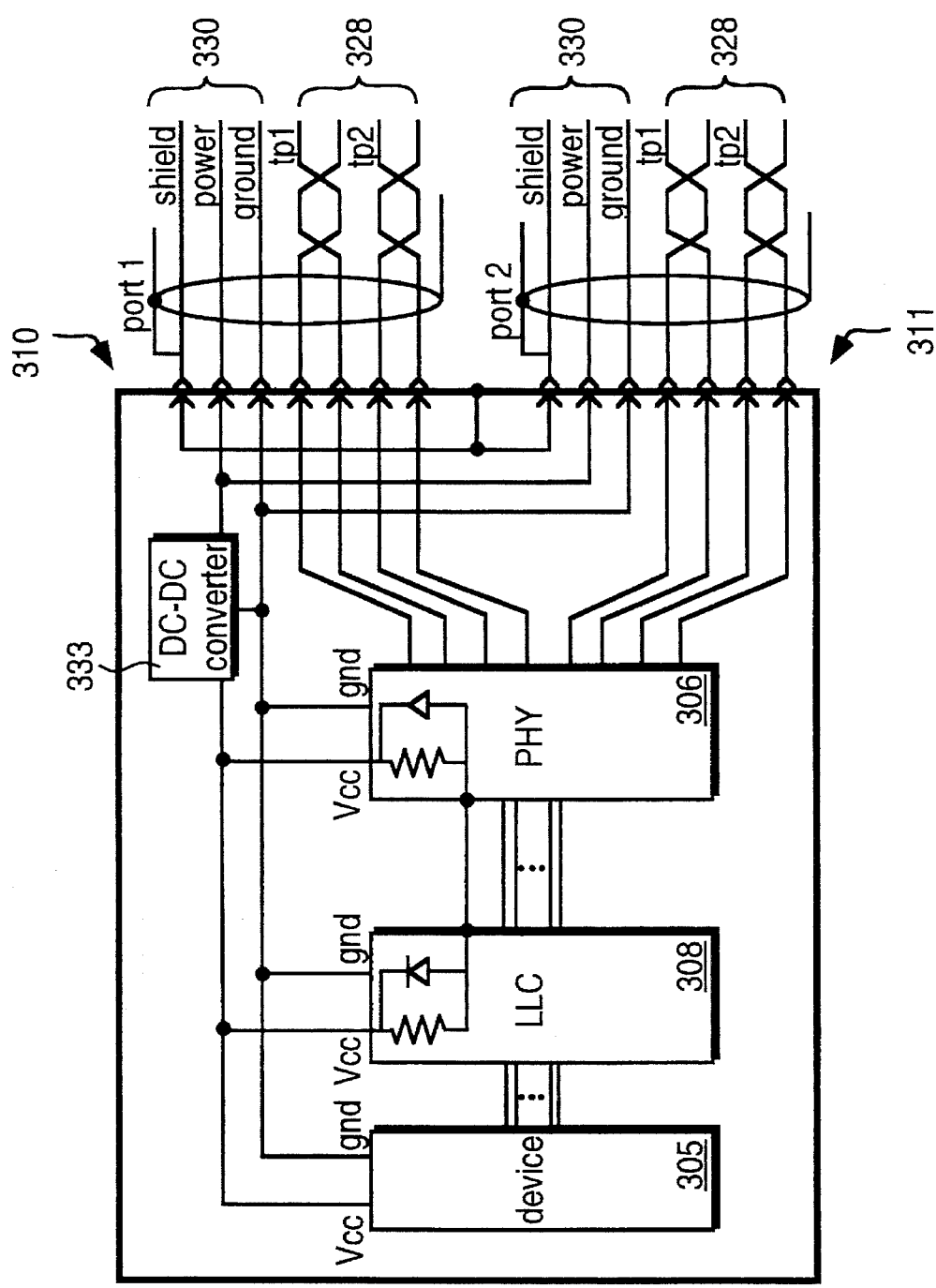
FIG. 4 is a schematic illustration of a node having a two port floating device.
Figure 5:
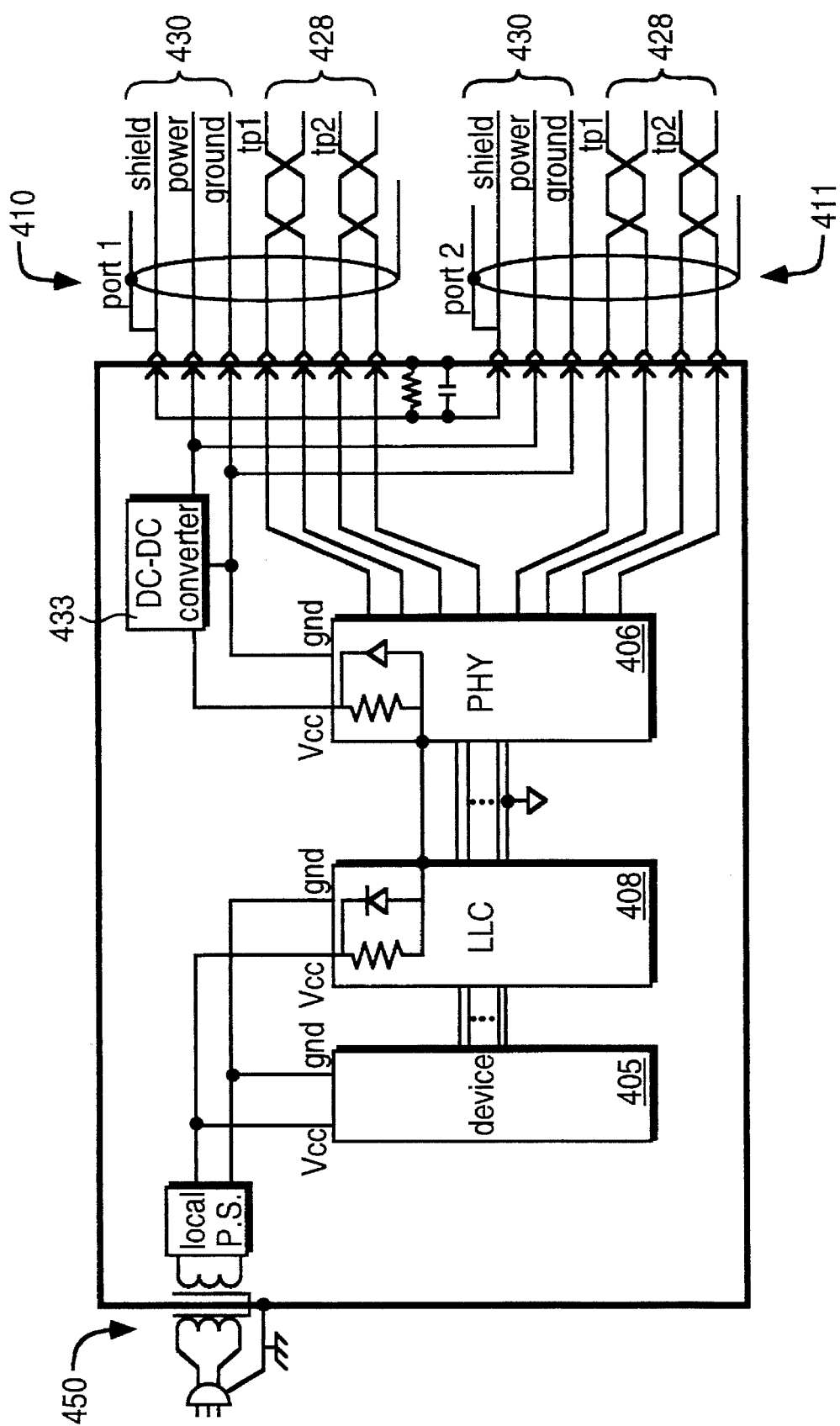
FIG. 5 is a schematic illustration of a node having a two port autonomous device without galvanic isolation.
Figure 6:
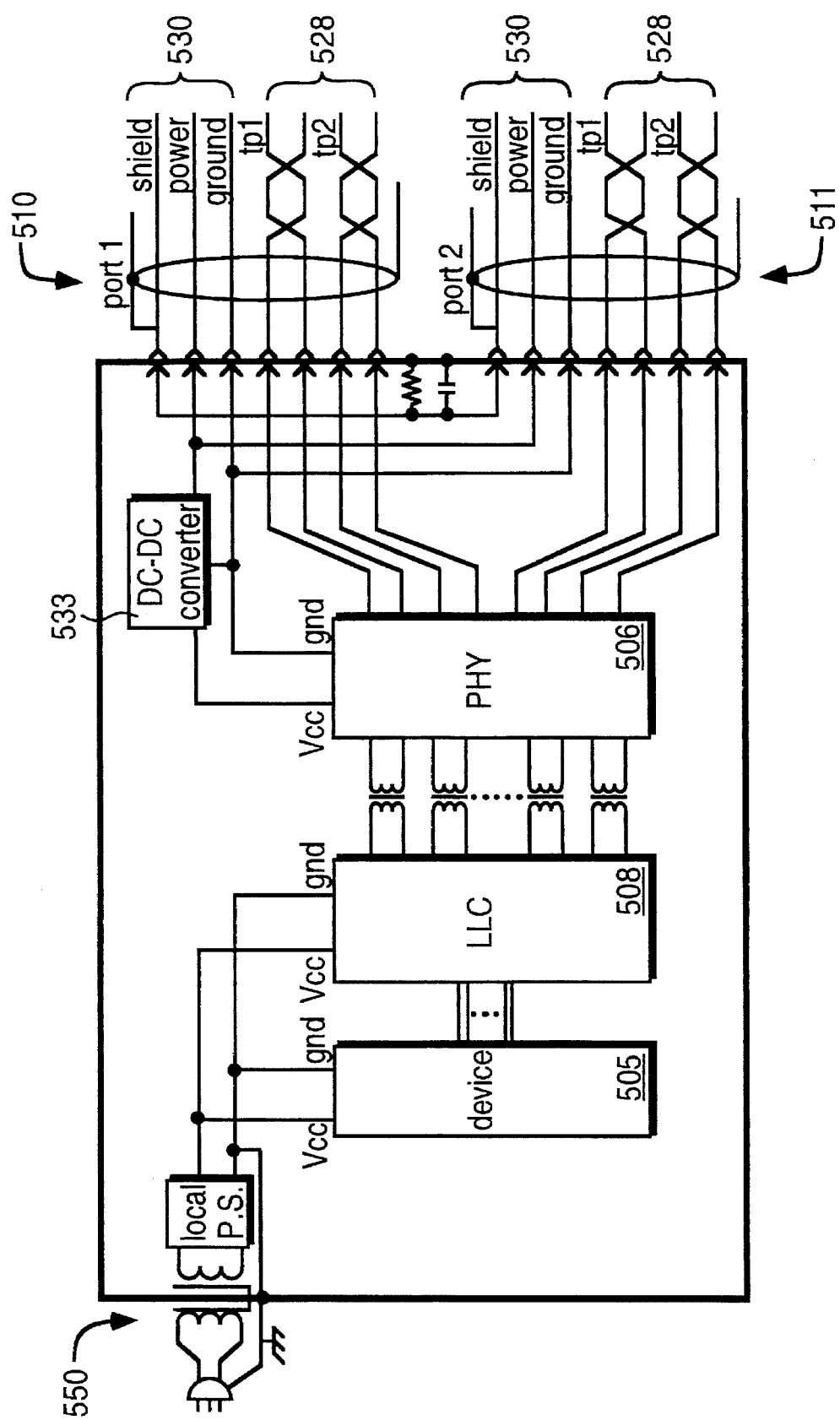
FIG. 6 is a schematic illustration of a node having a two port autonomous device with galvanic isolation.
Figure 7:
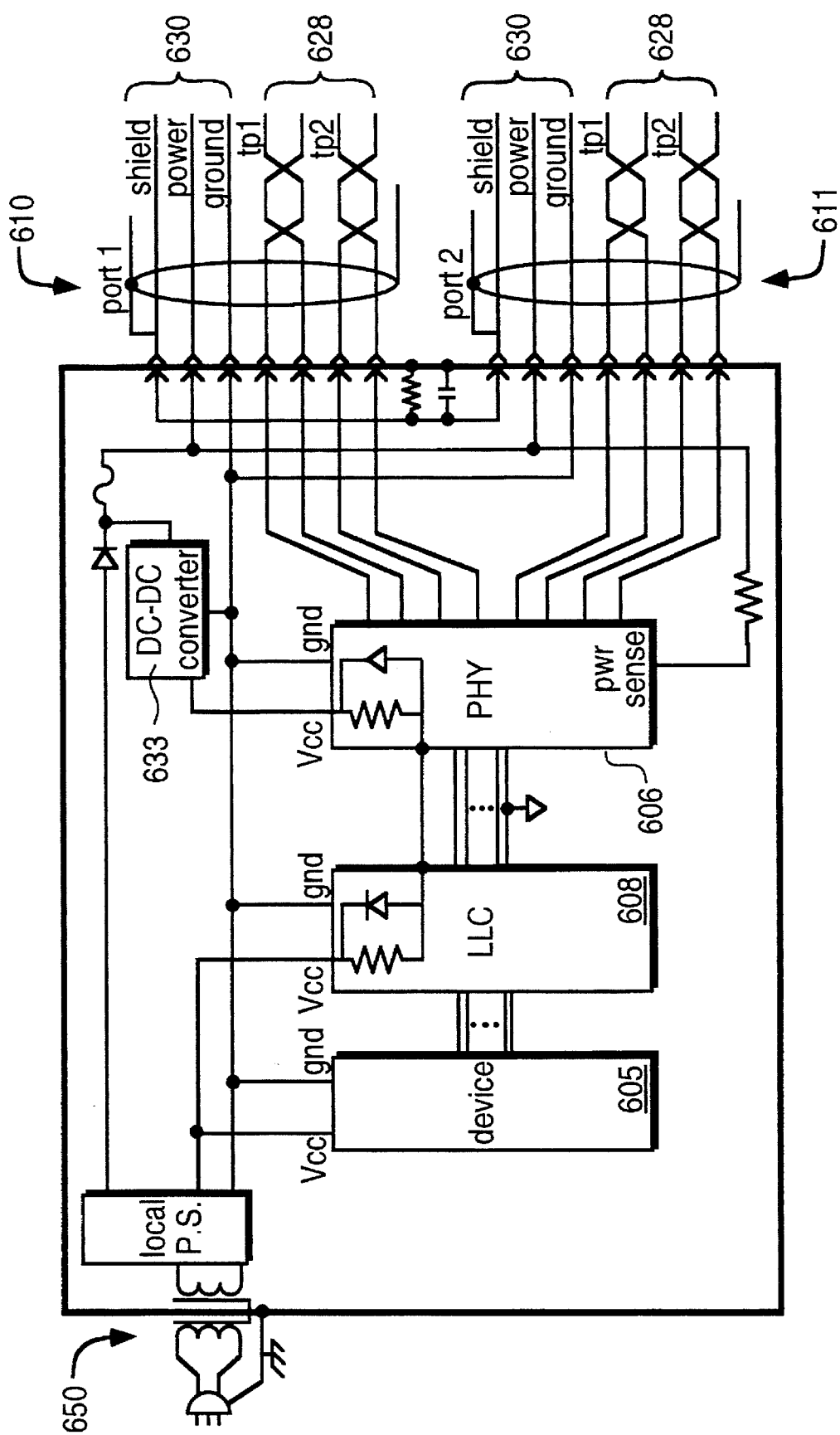
FIG. 7 is a schematic illustration of a node having a two port power supplier device without galvanic isolation.
Figure 8:
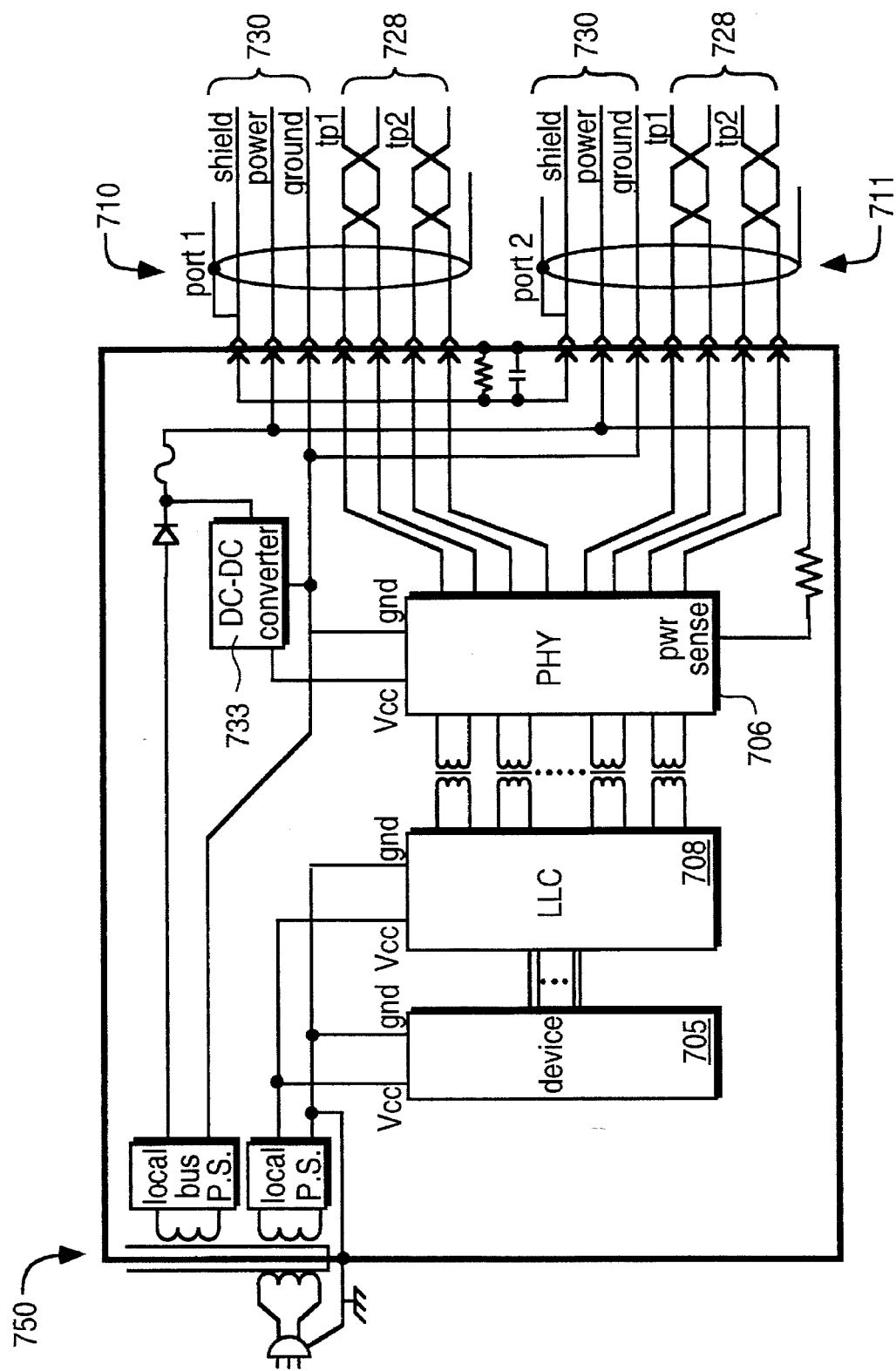
FIG. 8 is a schematic illustration of a node having a two port power supplier device with galvanic isolation.
Figure 9:
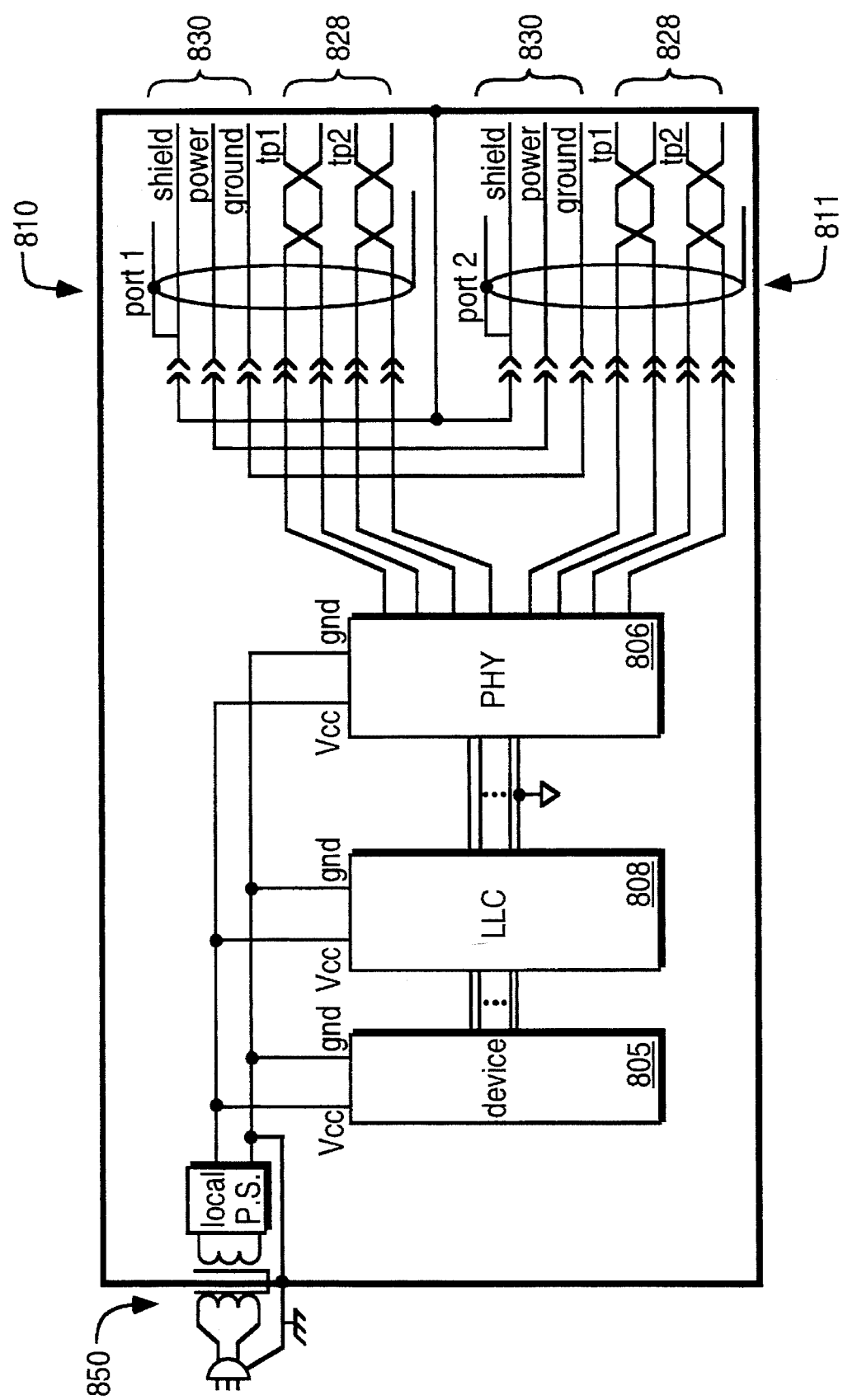
FIG. 9 is a schematic illustration of a node having a two port internal device.
Figure 10:
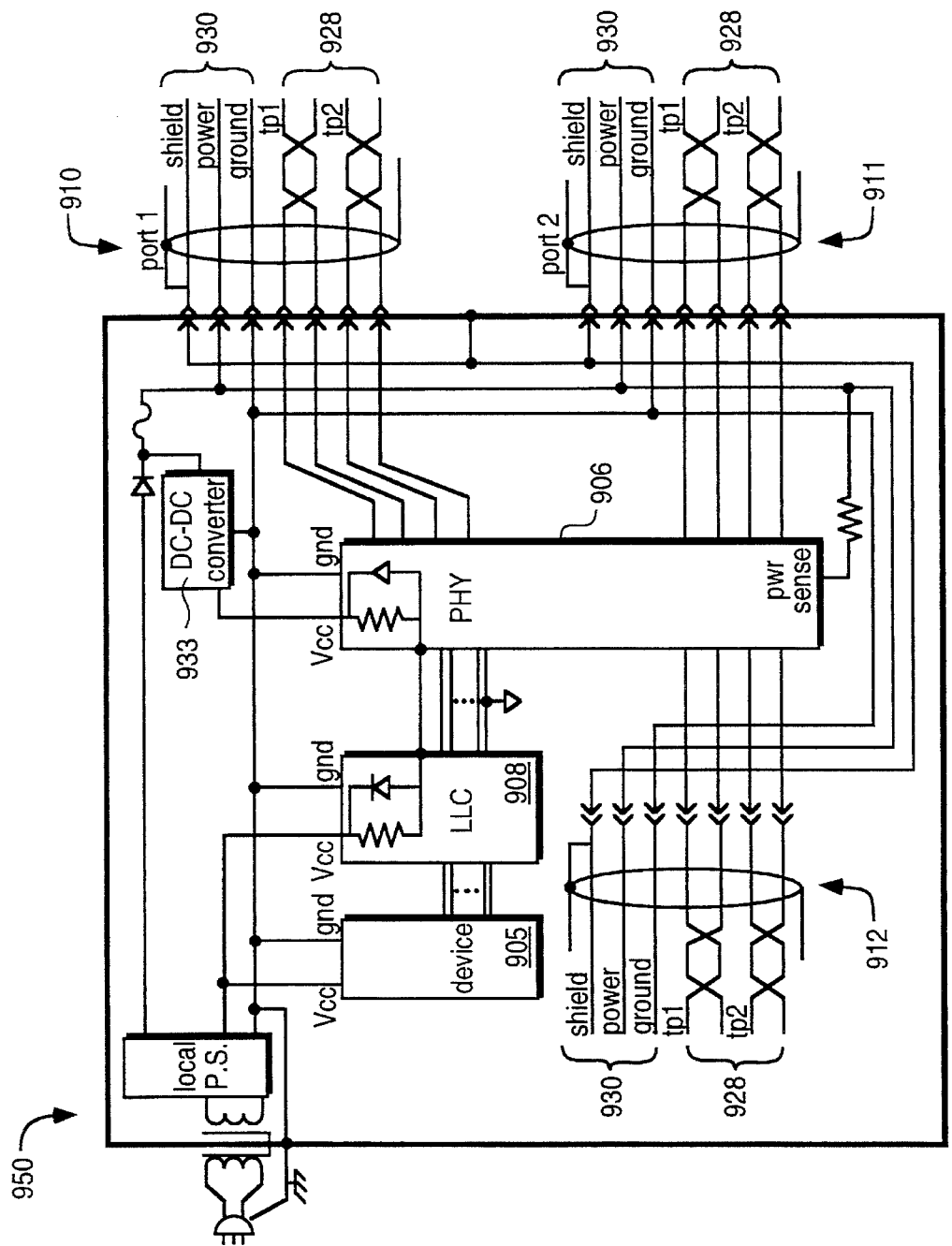
FIG. 10 is a schematic illustration of a node having a three port device without galvanic isolation.
Figure 11:
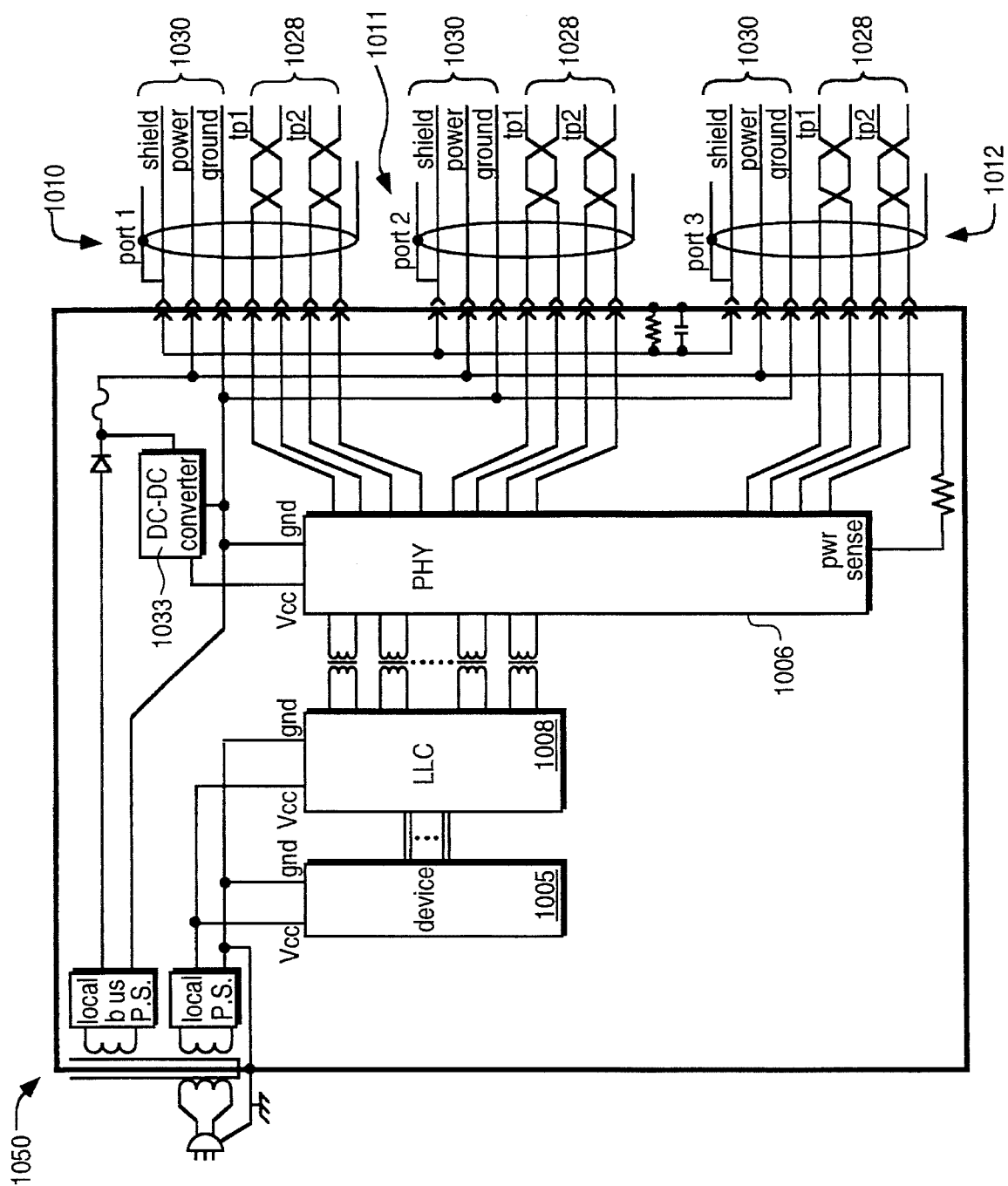
FIG. 11 is a schematic illustration of a node having a three port device with galvanic isolation.

Schematic illustrations of the hardware connections of the aforementioned devices to the LLC and PHY chips are provided in FIGS. 4–11. The various hard-ware interconnection diagrams illustrated in FIGS. 4–11 are fairly similar is layout, hence only the FIG. 4 will be described in detail. FIG. 4 illustrates an exemplary node 302 having a device 305, a PHY 306 and an LLC 308. Device 302 is a two port floating device. PHY 306 has corresponding ports 310 and 311, of the type identified above via reference numeral 207. Bus interconnection lines 312 and 313, respectively, are connected into ports 310 and 311. Each line 312 and 313 includes two pairs of twisted-pair data transmission lines 328 and a power transmission line 330. Each power transmission line includes separate shield, ground and power lines. The node of FIG. 4 includes a single DC—DC converter 333 connected between the power transmission line 330 and device, 305, PHY 306 and LLC 308. The node of FIG. 5–11 include similar components, identified by like reference numerals by sequential incremented by one hundreds, i.e. 402, 504, 602, etc.. The nodes of FIGS. 5–11 additionally include local power supplies 450, 550, etc., for connection into a AC power supply.

For P1394 implementation the following parameters are preferred. The power output to the bus by a power supplying device is between 10 and 40 volts DC, at a nominal current of 1.5 Amps. The devices connected to the bus must be able to operate normally when voltage on the bus is between 7 volts DC and 40 volts DC. The voltage on the bus is measured between the power line and the ground line at each bus node. All devices must be capable of operating normally with a minimum ground voltage drop between two adjacent nodes on the bus of 0.5 volts.

A low port count device, described above, must not use more than 160 mA total current from the nominal 5 volt power line. A power usage request must be transmitted to the power manager before the device is allowed to draw additional current. A high port count device must not use more than 230 mA total current from the nominal 5 volt power supply with submitting a power usage request to the power manager. High port count devices are always required to supply power to the bus. Soft-power control capability is preferably implemented within each high port count device to allow for activation of the device by the power manager to increase the total power supplied to the bus.

Battery powered devices are controlled to supply power to the bus when no non-battery powered devices are supplying power, and to drawn power from the bus otherwise. In other words, if at least one device having a AC power input capability to operating to supply power to the bus, then the battery powered devices need not provide power via their battery units. This helps conserve battery power when other power sources are available, yet allows the bus to operate on battery power when needed. Control of the battery powered device may be achieved by power manager 50 (FIG. 2) via data packets and soft-power on signals sent over the bus. Alternatively, or as a supplemental control mechanism, each battery unit is configured to provide power at a voltage below the voltage provided by non-battery powered sources. An over-voltage protection circuit 37 (FIG. 1), is connected between each battery unit 36 and the bus. Protection circuit 37 detects the voltage of power carried on the bus and disconnects the battery unit from the bus if a higher voltage is detected than is output from the battery. In this manner, battery power is automatically disconnected whenever a non-battery powered source is supplying power to the bus. The battery unit is automatically connected to the bus when either no power is present on the bus or power on the bus is at the battery-powered voltage level. By configuring each battery powered device to provide power at an equal voltage to each other, a number of battery powered devices can provide power simultaneously to the bus. All are automatically disconnected by respective protection circuits when at least one non-battery powered device begins supplying power to the bus. The construction and operation of each individual protection circuit 37 may be entirely conventional.

Preferably, galvanic isolation of at least some of the devices connected to bus 200 is provided. Galvanic isolation may be implemented using an isolation barriers at the interface between each PHY chip and it associated device. Alternatively, feed-through isolation barriers may be inserted in-line with a cable segment. In either case the galvanic isolation barrier should withstand a 500 volts peak voltage across the barrier. Galvanic isolation is provided in the nodes illustrated in FIGS. 6, 8 and 11.

For a device to draw more power from the bus than the minimum allocated powers listed above, the device must transmit a power usage request to the power manager. Alternatively, a device requesting activation of another device may transmit the power usage request. Power usage is negotiated with the power manager in increments of 0.1 watts. The power manager uses a power calculation formula of:

$$P_{req} = I * V * K_{dc} * K_{pd} / 100,$$

where $K_{pd}$ is a power distribution efficiency coefficient, typically 0.8, $K_{dc}$ is a DC—DC converter worst case efficiency within an expected load operating range and an input voltage range of 7 volts DC to 40 volts DC, typically 0.7, V is the nominal operating voltage, typically 5 volts, I is the maximum expected current consumption from the power line in units of mA, and Preq is the "required power" data for the power manager, rounded up to 0.1 watt increments. The converter efficiency of $K_{dc}$ includes output voltage tolerance effects.

Although a single power manager may be provided in the host, preferably each high port count device includes power manager software to allow the device to operate as the power manager. Power that a high port count device is capable of supplying to the bus is transmitted to the bus currently operating power manager in increments of 0.1 watts. To determine the amount of power that the device is capable of supplying, the following calculation formula is used:

$$P_{av} = I_{source} * V_{out} / 100,$$

wherein $V_{out}$ is the minimum voltage the device may put on the bus, in volts, $I_{source}$ is the device worst case current source capability in mA, and $P_{av}$ is the "available power" data for the power manager, rounded up to increments of 0.1 watts.

The power manager maintains, at all times, a reserve of 2 watts to account for an additional low port count device insertion.

Of course, other power negotiation formulas may be employed, and other system power constraints, may be employed, consistent with the general principles of the invention. The aforementioned rules and constraints are preferred.

What has been described is a system for managing the power on a device interconnect bus, particularly one implemented to IEEE P1394 standards. The power management system tracks the total amount of power used by components connected to the bus and tracks the total amount of power supplied to the bus. The power manager controls the operation of devices to ensure that a sufficient amount of power is available. In particular the system sequences the use of devices, such as disk drives and the like, to maintain the total power drawn from the bus below a maximum available amount of power.

Although described with reference to a computer system having a host and a set of peripheral devices, the principles of the invention may be exploited in a variety of systems interconnected via a bus. Moreover, the functions of the power manager may be implemented in a device other than the host or may be implemented in any of a class of devices. For example, in a bus system including a phone interface unit, such as a modem, the phone interface can assume control of power management functions if the host is powered off, or if there is no host. In such a system, only the phone interface unit and the bus itself need be powered at all times. When a telephone communication is received by the phone interface unit, the phone interface unit having power management functions powers up other devices connected to the bus to perform a desired function, such as to receive a facsimile, voice mail message or data transmission. In this manner the advantages of a power manager may be exploited in a telecommunication system interconnected via a bus. In general, the principles of the invention may be exploited in any system having devices interconnected via a bus, wherein some of the devices require power drawn from the bus.

Some portions of the detailed descriptions provided above are represented in terms of algorithms and symbolic representations of operations on data bits within a computer memory. These algorithmic descriptions and representations are means used by those skilled in the data processing arts to most effectively convey the substance of their work to others skilled in the art. An algorithm is here, and generally, conceived to be a self-consistent sequence of steps leading to a desired result. The steps require physical manipulation of physical quantities. Usually, though not necessarily, these quantities take the form of electromagnetic signals capable of being stored, transferred, combined, compared, and otherwise manipulated. It has proven convenient at times to refer to these signals as bits, values, elements, symbols, characters, terms, numbers and the like. It should be borne in mind, however, that all of these and similar terms are to be associated with the appropriate physical quantities and are merely convenient labels applied to these quantities.

Further, the manipulations performed are often referred to in terms, such as adding and subtracting, which are commonly associated with mental operations performed by a human operator. No such capability of a human operator is necessary or desirable in most cases in any of the operations described herein. Rather, the operations are machine operations. In all cases the distinction between the method of operations in operating a computer and the method of computation would be borne in mind.

Moreover, while certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for managing power provided to devices connected to a device interconnection bus, wherein power is supplied to at least one of said devices over said bus, said system comprising:

means for maintaining information regarding a maximum amount of power available for distribution to said devices;

means for maintaining information regarding individual power requirements for each of a plurality of said devices, said information including power requirements for one or more operational states of each device, wherein said means for maintaining information regarding the actual power requirements of said devices includes:

means for periodically determining a current optional state of each device;

means for maintaining information regarding a total amount of power actually used by all of said devices at any given time; and means for controlling operation of said devices in view of said maximum amount of power available, said individual power requirements of said devices, and said total amount of power actually used by said devices to ensure that a total power required by all devices does not exceed said maximum amount of power available, wherein said means for controlling operation of said devices includes:

means for receiving a power usage request over the bus, said power usage request identifying a device for which power is requested, said power usage request additionally identifying the desired operational state of said requested device;

means for periodically determining a new total power requirement based on the grant of the power usage request;

means for determining whether the new total amount of power exceeds said maximum available amount of power; and power negotiation means, responsive to a determination that the new total amount of power exceeds the maximum available amount of power, for granting or denying said power usage request.

2. The system of claim 1, wherein said power negotiation means includes means for deferring activation of one or more of said devices for which a power usage request is received to maintain the total amount of required power at level that is no greater than said maximum available power.

3. The system of claim 1, wherein said power negotiation means includes means for revoking a power usage grant to a previously granted device, to allow a power usage grant to a newly requested device.

4. The system of claim 1, wherein said power negotiation means includes means for activating additional devices which are capable of providing power to said bus, to increase the total amount of power available.

5. The system of claim 1, wherein said means for activating an additional device includes means for transmitting soft-power on commands over said bus to said inactive device.

6. The system of claim 1, wherein at least one of said devices includes a battery power capability, and wherein said power negotiation means includes means for activating said battery power capability of said device when an insufficient amount of surplus power is available to power said device with said battery power and means for deactivating said battery power capability of said device when said amount of surplus power is sufficient to power said device.

7. The system of claim 6, wherein said battery power device outputs power to said bus at a voltage level below a voltage provided to said bus by non-battery-powered devices, whereby said battery-powered device outputs power to said bus when no non-battery-powered devices are supplying power to said bus and draws power from said bus when at least one non-battery-powered device is providing power to said bus.

8. A system for managing power provided to devices connected to a device interconnection bus, wherein power is supplied to said devices over said bus, and wherein each of said devices is capable of operating in a plurality of operational states, each requiring a differing amount of power, said system comprising:

means for maintaining information regarding a total amount of power actually drawn from said bus by devices connected to said bus and for maintaining information regarding a total amount of power available to said devices over said bus;

means for receiving power usage requests from said bus over said bus, said power usage requests specifying a desired device and a desired operational state of said device;

means for determining whether there is an available power surplus sufficient to allow a grant of said power usage request;

means, responsive to said determination, for granting or denying said power usage request; and sequencing means, responsive to a determination that an insufficient amount of power is available, for deferring operation of said device for which a power usage request has been received pending an increase in said power surplus.

9. The system of claim 9, further including control means, responsive to a determination that an insufficient amount of surplus power is available, for changing the operational status of an operational device to a lower power requirement level to provide an increased power surplus to enable operation of said device for which a power usage request was received.

10. The system of claim 9, wherein said control means includes means for deactivating an active device to provide an increased power surplus.

11. A system for managing power provided to devices connected to a device interconnection bus, wherein said bus carries power, and wherein said devices are capable of operating in a plurality of operational state, with different operational states of a device requiring different amounts of power, said system comprising:

means for maintaining information regarding a power surplus, if any, available on said bus;

means for maintaining information regarding all devices connected to said bus that may require power from said bus, said information including the power requirements of the device for each of the operational states of the device;

means for receiving power usage requests from said devices over said bus, said power usage requests specifying a desired device and a desired operational state of said device;

means for determining whether the power surplus, if any, if sufficient to allow a grant of said power usage request;

means, responsive to said determination, for granting or denying said power usage request;

sequencing means, responsive to a determination that an insufficient amount of power is available, for deferring operation of said device for which a power usage request has been received pending an increase in said power surplus.

12. The system of claim 11, further including control means, responsive to a determination that an insufficient amount of surplus power is available, for changing the operational status of an operational device to a lower power requirement level to provide an increased power surplus to enable operation of said device for which a power usage request was received.

13. The system of claim 12, wherein said control means includes means for deactivating an active device to provide an increased power surplus.

14. The system of claim 12, wherein said means for controlling operation of said devices includes:

means for receiving a power usage request over the bus, said power usage request identifying a device for which power is requested, said power usage request additionally identifying the desired operational state of said requested device;

means for periodically determining a new total power requirement based on the grant of the power usage request;

means for determining whether the new total amount of power exceeds said maximum available amount of power; and power negotiation means, responsive to a determination that the new total amount of power exceeds the maximum available amount of power, for granting or denying said power usage request.

15. The system of claim 14, wherein said power negotiation means includes means for deferring activation of one or more of said devices for which a power usage request is received to maintain the total amount of required power at level that is no greater than said maximum available power.

16. The system of claim 14, wherein said power negotiation means includes means for revoking a power usage grant to a previously granted device, to allow a power usage grant to a newly requested device.

17. The system of claim 14, wherein said power negotiation means includes means for activating additional devices which are capable of providing power to said bus, to increase the total amount of power available.

18. The system of claim 17, wherein said means for activating an additional device includes means for transmitting soft-power on commands over said bus to said inactive device.

19. A method for managing power provided to devices connected to a device interconnection bus, wherein power is carried on said bus, said method comprising the steps of:

receiving information specifying a total amount of power surplus, if any, on said bus, said power surplus being an amount of power available on said bus in excess of power currently drawn from said bus by said devices and power required by the bus itself;

receiving and storing information specifying all of the devices connected to said bus that are capable of drawing power from said bus, including information specifying the power requirements of each operational state of each device;

receiving power usage requests over said bus, said power usage requests specifying a device and a desired operational state of said device;

determining whether the surplus power, if any, is sufficient to allow operation of said device in said requested state;

granting said bus request, if the surplus power is sufficient, and denying said bus request if said surplus power is insufficient; and if said power usage request is denied, deferring granting said power usage request pending an increase the power surplus, if any, to an amount sufficient to power said requested device at said requested operational state.

20. A method for managing power provided to devices connected to a device interconnection bus, wherein power is carried on said bus, said method comprising the steps of:

receiving information specifying a total amount of power surplus, if any, on said bus, said power surplus being an amount of power available on said bus in excess of power currently drawn from said bus by said devices and power required by the bus itself;

receiving and storing information specifying all of the devices connected to said bus that are capable of drawing power from said bus, including information specifying the power requirements of each operational state of search device;

receiving power usage requests over said bus, said power usage requests specifying a device and a desired operational state of said device;

determining whether the surplus power, if any, is sufficient to allow operation of said device in said requested state;

granting said bus request, if the surplus power is sufficient, and denying said bus request if said surplus power is insufficient; and if said power usage request is denied, controlling one or more currently operational devices to change the operational states of said devices to a states requiring less power.

21. A method for managing power provided to devices connected to a device interconnection bus, wherein power is carried on said bus, said method comprising the steps of:

receiving information specifying a total amount of power surplus, if any, on said bus, said power surplus being an amount of power available on said bus in excess of power currently drawn from said bus by said devices and power required by the bus itself;

receiving and storing information specifying all of the devices connected to said bus that are capable of drawing power from said bus, including information specifying the power requirements of each operational state of each device;

receiving power usage requests over said bus, said power usage requests specifying a device and a desired operational state of said device;

determining whether the surplus power, if any, is sufficient to allow operation of said device in said requested state;

granting said bus request, if the surplus power is sufficient, and denying said bus request if said surplus power is insufficient;

receiving information specifying the power output of devices capable of supplying power to said bus; and controlling said power-supplying devices to activate or deactivate one or more of said devices in response to a determination of the total amount of power required in granting said power usage requests.

* * * * *